(12) United States Patent
Emmerink et al.

(10) Patent No.: US 7,643,501 B1
(45) Date of Patent: Jan. 5, 2010

(54) METHOD AND SYSTEM FOR SETTING UP AND/OR CLEARING A COMMUNICATIONS LINK BETWEEN TWO TYPES OF DEVICES

(75) Inventors: Antonius Emmerink, Munich (DE); Egon Klein, Germering (DE); Andreas Steffan, Munich (DE); Josef Wahler, Taufkirchen (DE); Rainer Windecker, Munich (DE); Steffi Winkler, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 1541 days.

(21) Appl. No.: 10/088,683

(22) PCT Filed: Sep. 13, 2000

(86) PCT No.: PCT/DE00/03176

§ 371 (c)(1),
(2), (4) Date: Jul. 9, 2002

(87) PCT Pub. No.: WO01/22768

PCT Pub. Date: Mar. 29, 2001

(30) Foreign Application Priority Data

Sep. 21, 1999 (DE) ................................ 199 45 153

(51) Int. Cl.
*H04J 3/12* (2006.01)
*H04J 3/00* (2006.01)

(52) U.S. Cl. ...................... 370/410; 370/458; 370/522; 379/230

(58) Field of Classification Search ....................... None
See application file for complete search history.

(56) References Cited

U.S. PATENT DOCUMENTS

| 5,751,338 | A  | * | 5/1998 | Ludwig, Jr. ............... 348/14.12 |
| 6,078,658 | A  | * | 6/2000 | Yunoki .................. 379/220.01 |
| 6,622,016 | B1 | * | 9/2003 | Sladek et al. ............. 455/414.1 |
| 6,982,950 | B1 | * | 1/2006 | Gardner ...................... 370/216 |
| 7,085,362 | B1 | * | 8/2006 | Christie et al. .............. 379/200 |

FOREIGN PATENT DOCUMENTS

| EP | 0 920 234 | 6/1999 |
| WO | WO 99/66759 | 12/1999 |

* cited by examiner

*Primary Examiner*—Hong Cho
*Assistant Examiner*—Robert C Scheibel
(74) *Attorney, Agent, or Firm*—King & Spalding L.L.P.

(57) ABSTRACT

A method and an arrangement are specified for setting up and clearing communications links via a private branch exchange. A number of types of communications device are driven via the same controller. New devices with a transport network for transporting the communications data can thus be integrated in a private branch exchange by using TDM-based devices. The central configuration of the controller allows already existing central interfaces and databases relating to subscribers to be used. If required, service feature controllers can still be used.

16 Claims, 3 Drawing Sheets

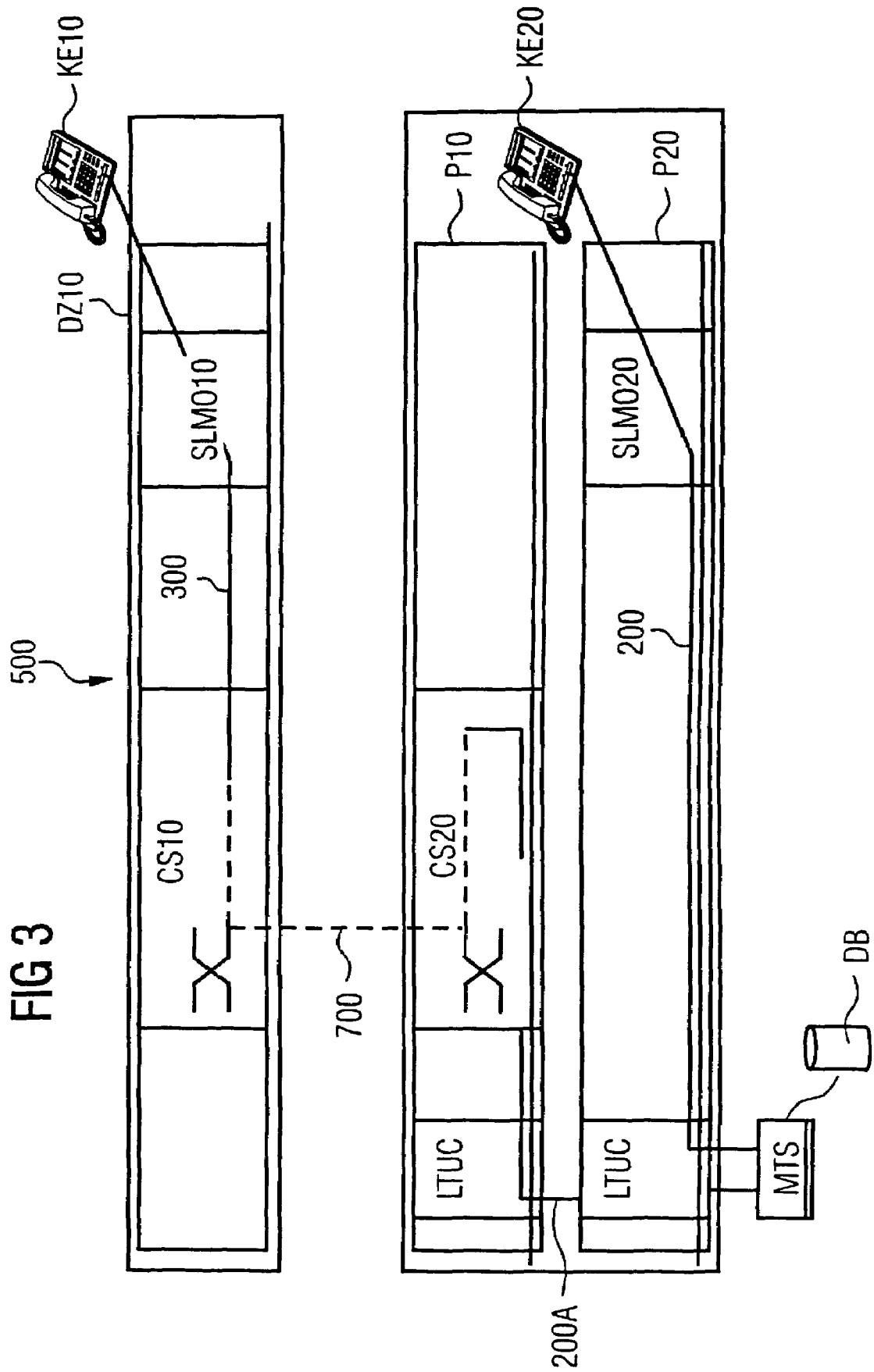

METHOD AND SYSTEM FOR SETTING UP AND/OR CLEARING A COMMUNICATIONS LINK BETWEEN TWO TYPES OF DEVICES

CLAIM FOR PRIORITY

This application claims priority to International Application No. PCT/DE00/03176 which was published in the German language on Sep. 13, 2000.

TECHNICAL FIELD OF THE INVENTION

The invention relates to a method and an arrangement for setting up and clearing, or maintaining, communications links, and in particular for a private branch exchange, and for the terminals connected to it.

BACKGROUND OF THE INVENTION

Owing to the increasing amount of communications traffic resulting from the increasing number of communications subscribers, and from the increasing requirements for the amount of data to be transmitted, transmitting devices, in particular private branch exchanges, are subject to increasingly severe requirements in terms of the amount of data to be transmitted by a communications link and the number of communications terminals which can be connected to one another.

Present-day devices are based, for example, on the TDM method (Time Division Multiplexing) in which communications data from different connections is transmitted in respectively defined time slots. A connection between different communications partners is produced by a switching matrix which, on the basis of control information, associates incoming time slots on an incoming connection with outgoing time slots on an outgoing connection. Such switching matrices generally have a fixed size and can produce only a defined number of connections, which often makes it harder to adapt switching systems to meet the requirements. Furthermore, the time slots have a restricted capability to accommodate data. For example, one switching matrix can produce 4096 connections, while a maximum of 64 kbits of data can be transmitted within one time slot.

An increase in the number of subscribers can thus be taken into account only in steps of 4096 connections. However, additional development efforts for matching the switching device to the greater number of subscribers is required in order to utilize these different extension levels. It is likewise impossible directly and flexibly to increase the transmission performance of each connection, and this can at best be done by setting up two or more communications links, that is to say in the form of steps of 64 kbits. However, this type of bandwidth multiplication has not been used in practice for transmission via ISDN (Integrated Services Digital Network) and scarcely any terminals are available for this purpose.

Although such existing communications systems have disadvantages which are intended to be overcome in the course of new developments for future communications devices, seamless integration of existing and new communications devices to form a homogeneous communications infrastructure is absolutely essential, at least during a transitional phase.

This is firstly because the investments that have already been made by the end users and communications network operators must be protected. Secondly, this is because it is technically essential to avoid individual communication islands, which the different systems would result in.

SUMMARY OF THE INVENTION

In one embodiment of the invention, there is a method for setting up and/or clearing a communications link via communication devices of at least a first and a second type. The method includes signaling the at least first and second type of communication devices to control the setting up and/or clearing of the communications link, and setting up and/or clearing the connection for the first type via at least one decentralized switching device, wherein the signaling takes place from a central device.

In another aspect of the invention, the connection is set up and/or cleared via a central device for the second type.

In another aspect of the invention, the connection is set up via a transport network for the first type.

In yet another aspect of the invention, the central device controls a decentralized switching device.

In another aspect of the invention, communications data for the communications link is converted in the region of a decentralized switching device for communication devices of different types.

In another aspect of the invention, the method includes setting up and/or clearing the communications link from a communications terminal which is configure for connection via time slots in a time slot multiplexing connection, the connection being set up via a transport network by producing, in the central device, at least one time slot control information item, which is used for setting up connections in the transport network, and one time slot is reserved for transferring communication data between communication devices of different types.

In still another aspect of the invention, the time slot control information is linked to a transport-network-specific information item and is transmitted to a decentralized device.

In another aspect of the invention, an asynchronous transmission method is used for transmission via the communications link.

In another embodiment of the invention, there is a system for setting up and/or clearing a communications link via communication devices of at least a first and a second type. The system includes, for example, a transport network to provide the communications link between communication devices of a first type, a control network to control the setting up and/or clearing of the communications link, a switching matrix to provide the communications link between communication devices of the second type, and a device to control the setting up and/or clearing of connections in the transport network through the control network, the device being operatively connected to the switching matrix, and connection control information for the switching matrix being supplied to them as part of a control information item.

In another aspect of the invention, the transport network has a different topology than the control network.

In another aspect of the invention, the transport network has at least one decentralized device for connection of a communications terminal, and has a switching device in the region of the decentralized device which provides the communications link in the transport network.

In yet another aspect of the invention, the communications device of the second type has at least one peripheral device with at least one device for connection of a communications terminal, and has a switching device to provide the communications link in the transport network.

In another aspect of the invention, the system includes a conversion apparatus for conversion of communication data, which conversion apparatus converts communication data in at least one data flow direction as a function of the type of communication device, with at least data types for a communication device of the first type and for a communication device of the second type.

In another aspect of the invention, the conversion apparatus is configured in the data flow in the immediate vicinity of a decentralized switching device.

In still another aspect of the invention, the system has a central device to provide at least one connection-related service feature, the device being operatively connected to the central device.

In another aspect of the invention, the system is in the form of a private branch exchange and has at least one decentralized device for connection of communications terminals.

In another aspect of the invention, the system has a control device to provide the communications link in the region of the decentralized device, if the central control device is not available.

BRIEF DESCRIPTION OF THE DRAWINGS

Exemplary embodiments of the invention will be explained in more detail in the following text with reference to figures, in which:

FIG. 3 shows an example of an integrated communications arrangement.

DETAILED DESCRIPTION OF THE PREFERRED EMBODIMENTS

Figure 1:
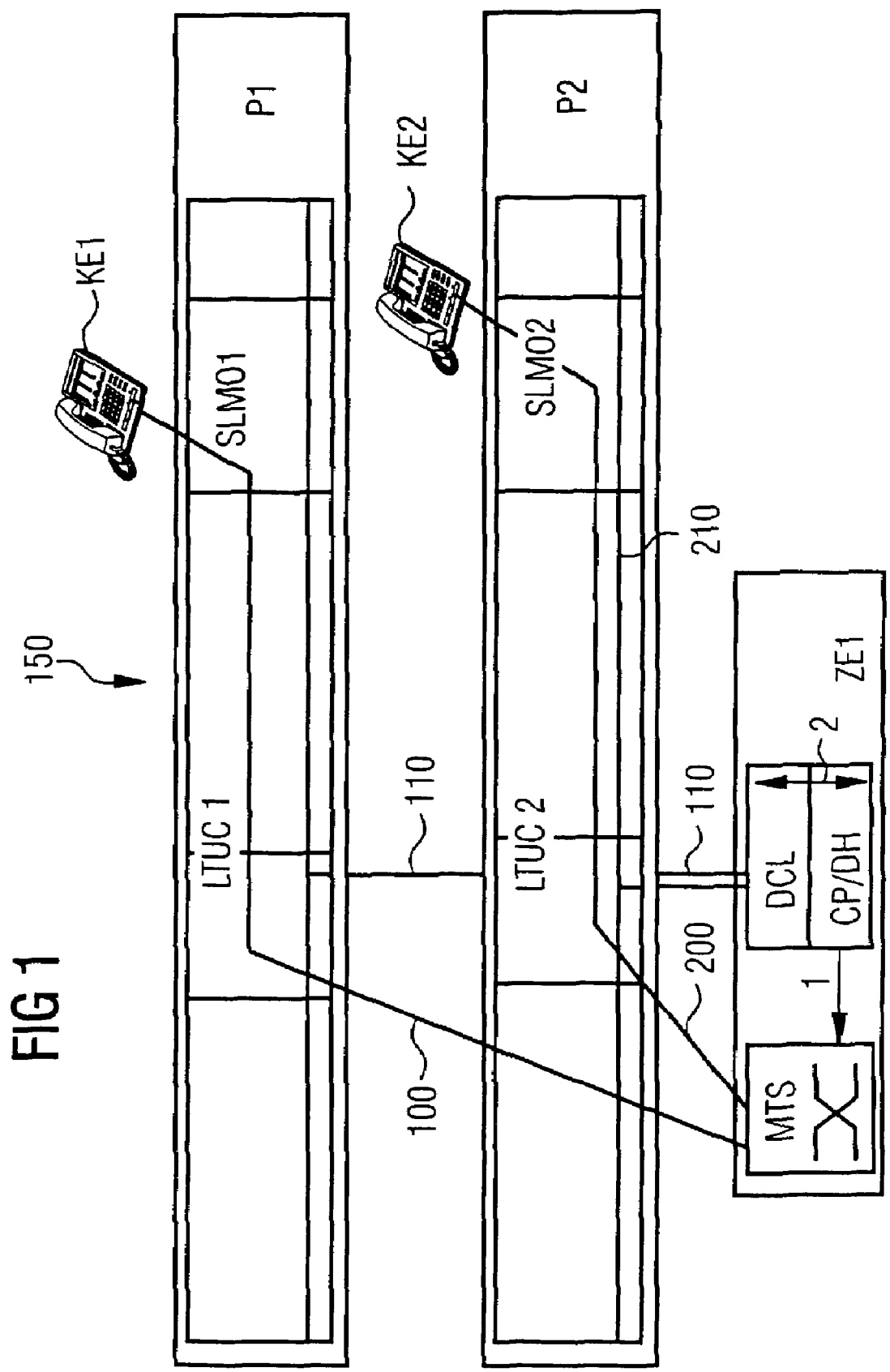
FIG. 1 shows a conventional communications arrangement of a second type.

The specifies a method and an arrangement to provide or to maintain a communications link which ensures a high level of flexibility with regard to matching to the number of communications links to be provided, to the amount of communication traffic on each connection, and to its physical extent, and which can be introduced without any problems into an existing communications landscape.

According to one embodiment of the invention, one advantage of the invention is to operate a group of communications devices of different types, with a control function being implemented for one type in a control network and the connection function being offered via a transport network. This is advantageously achieved with the assistance of a connecting device which can reside on any desired type of transport network which is suitable and available depending on the application type. For this drive function, it is advantageous to use a control of a known communications device, which accesses the control network.

Hence, an increasing amount of communication traffic can be taken into account by a means of a transport network of suitable size and with sufficient transmission capacity, while the controller, for example for a control network, need not be upgraded and can remain very largely in its present form. Furthermore, the invention ensures that decentralized communications arrangements which are physically distributed over long distances can be operated from a group of communications devices of different types in which, particularly in the case of communications devices of the first type, it is advantageous that the control information for a central control device need be maintained, while the communications links are provided via a separate transport network with a suitable topology. The joint use of the controller for communications devices of different types creates a homogeneous communication landscape, which allows simple integration of widely differing communications devices.

When using a central control device, it is advantageous to be able to continue to use existing databases and control methods of a central switching device in order to control decentralized switching devices in the transport network, in the course of providing a communications link. This ensures smooth integration of existing solutions with a connection function via a switching matrix and migration to new solutions, while still retaining the advantages of central data administration as well as fault identification and rectification, with greater flexibility.

It is also advantageous for connections to be set up via decentralized devices in the transport network. This advantageously allows transport connections to be provided within a decentralized device, in particular between a number of decentralized devices, whose datastreams thus do not load the central controller. A high level of redundancy is achieved, and switching devices in each case according to the latest prior art can be used for the transport network, such as the ATM, Ethernet or IP switching systems, at the present time.

In one aspect of the invention, one central device controls the decentralized switching devices, since this allows a number of decentralized devices to be connected to one another, which jointly behave like a single switching device. This allows connection-related service features which are implemented centrally to be provided for communications links via the transport network without having to carry out any additional development work with regard to the transport network. There is likewise no need for any adaptation work on the controller side for the service features that are provided, in order to make them available throughout the network. One advantageous feature is that it is also thus possible to use, throughout the network, those methods on distributed switching devices which are otherwise available only to a single local switching device, and not to a number of switching devices. Thus, even applications and interfaces for applications which in the past could access only single systems can now advantageously be used for the decentralized switching devices. Only a single controller is thus ever required in a system formed from communications devices of different types, although more than one controller could be used.

In still another embodiment of the invention, communication data types for different types of communications devices are advantageously converted in a decentralized manner, since this allows a high level of flexibility to be achieved with regard to the topology of the networks which are operated by the various communications devices, and any desired number of types of communications devices can be operated together with one another. The conversion capacity of a conversion device can thus likewise advantageously be matched to the switching capacity of a decentralized device.

In one aspect of the invention, terminals which can be accessed by means of a time slot multiplexing connection are advantageously connected via the transport network, with new suitable connection information being generated in the controller from convention time-slot-related connection information, in order to control the provision of a communications link via the transport network. This allows already existing methods for controlling TDM switching matrices to be used to set up connections based on this variant of the method, thus combining TDM-based switching systems with such communications devices without any major effort.

However, other dynamically set-up connections, such as ATM connections or IP connections, can also be set up in the transport network without any restriction. These connections in this case advantageously appear to the controller to be similar to conventional TDM connections, and are also processed as such. In particular, conventional time-slot-related connection information is also generated for this purpose, and is then once again converted to new connection information, matched to the transport network. Existing and new communications technologies can thus be integrated particularly easily, since already existing methods for controlling TDM connections can be used to set up connections via communications devices of widely differing types.

The technical implementation complexity for this embodiment is likewise reduced in this way, the integration of a conventional method and migration to a high-powered method is simplified because, for example, since matching this control information to the requirements of a transport network are simply required.

In another embodiment of the invention, transport data is transmitted in an advantageous manner using an asynchronous transfer mode, since ATM networks are technically proven and offer a basis for increased transport capacities and more flexible distribution of these capacities. Furthermore, ATM networks are particularly suitable for time-critical transmission of high data rates via decentralized switching devices, since they can guarantee the quality features required for voice and moving pictures (quality of service). They can therefore also be optimally matched to the requirements for different types of communications devices.

In still another embodiment of the invention, service features are advantageously provided via the central device for control purposes, since this allows desired transport networks and widely differing types of controlled communications devices to be supplied to an existing service feature controller. In addition, this advantageously allows already existing methods for providing service features still to be used, and there is no need to carry out independent adaptation to the service feature controller for each controlled device.

A combination comprising an arrangement for setting up and/or clearing or maintaining a communications link is advantageous which has a separate control network, in particular for transmitting signaling information, and a separate transport network, with the transport network being controlled by the control network, via suitable means. As a communications device of a first type, this is combined with a communications device of a second type and of a conventional design, in which communications links are produced via a switching matrix. The control commands which are produced for the switching matrix can advantageously be used for the high-performance communications device of the first type, without any excessive development effort being required for its adaptation.

Types of communications devices based on networks with widely differing topologies can thus advantageously be integrated in a TDM-based communications device, in which case the configuration of a control and transport network topology can also mean that this topology exists in logical structure form for the information paths while, in contrast, the data is transmitted via the same physical network.

This combination of the first and second type represents a minimal configuration of an integration solution.

The described arrangement in the control network advantageously has a central device for control purposes since this allows the subscriber administration and connection control, and the data storage, maintenance and protection associated with this, problem identification and rectification, and supply of new software output states to be carried out centrally.

The transport network advantageously has a decentralized device for connection of a communications terminal, and a decentralized switching device, which is provided in its area, for providing a communications link in the transport network. This makes it possible to supply large areas with communications links via a single private branch exchange, provided that the wiring complexity can be kept to a minimum, since a singe control network for one center need be managed, while the most suitable topology can be chosen for the connection of the decentralized switching devices through the transport network even for public networks or networks that have already been laid.

In yet another embodiment of the invention, the central control device is operatively connected to a device for providing service features, and which may also be an integral component of the control device, since this allows central provision of connection-related and other service features with minimal installation and implementation effort for a homogeneous communication infrastructure composed of widely differing types of communications devices. In addition to service features, this device for providing servers features can also provide more far-reaching applications and/or an interface to applications which go beyond communication service features. External servers, for example for call center solutions, CTI (Computer Telephony Integration) can thus advantageously be coupled centrally, and can be used in the network, via standardized interfaces.

According to one aspect of the invention, a private branch exchange can be set up advantageously combining at least one decentralized switching device with a central control device, since this allows a distributed private branch exchange to be provided in conjunction with a conventional communications device in the form of a minimal configuration with a single common controller, which can be expanded as required in a modular form.

It is preferable to arrange an emergency control device in the region of at least one decentralized device, to allow emergency operation between communications terminals which are connected to this decentralized device, if the central control device fails, or the control network is interrupted. This results in a high level of availability with a single system, corresponding to the availability of networked systems.

FIG. 1 shows an example of a known private branch exchange 150 of a second type with two peripheral devices P1 and P2, to each of which a communications terminal KE1 and KE2, which operates in digital or analog form, is connected. These peripheral devices P1 and P2 are accommodated in the same physical area as the central device ZE1. By way of example, they are located in the same room, or in the same cabinet with it. The terminals fill defined time slots in the PCM datastream (Pulse Code Modulation) with communication data. The digital or analog communications terminals KE1 and KE2 are connected to respective subscriber line modules SLMO1 and SLMO2, which supply to the PCM datastream, or take from it, digital data, which is intended for the respective terminals and/or originates from the respective terminals, via time slots which are defined by signaling. These PCM datastreams are annotated 100 and 200, respectively, in FIG. 1. In addition, signaling connections are shown, and are annotated 110 and 210, respectively. It should be noted that this is only a logical representation and does not represent a physical implementation. However, in reality, the transport data and the signaling data may be transmitted in the same connecting cable.

Furthermore, peripheral devices P1 and P2 as well as line trunk units LTUC1 and LTUC2 are shown here, and these control the data traffic to the subscriber line modules of the respective decentralized devices. The peripheral device P1 is supplied with signaling data via the line 110, and the peripheral device P2 is supplied via the signaling line 210.

As can clearly be seen here, both the information to be transported and the signaling information are supplied to a central device ZE1 in this arrangement. In this case, a signaling device DCL gathers and distributes messages 2, which are interchanged between the central device ZE1 and the peripheral devices P1, P2. The call processing CP controls the setting up and clearing of connections and, to do this, inter alia controls equipment-specific interface functions DH which are implemented, for example, in the form of program modules. In the process, setting commands 1 are produced for the switching matrix MTS. These setting commands essentially indicate which input of the switching matrix should be connected to which output in order to provide a communications link. Control and connection functions are thus in this case carried out by a single physically integrated functional unit in the communications network. In this case, for the purposes of the embodiment of the method, it is irrelevant whether CP and DH are components of the control software, and whether they are in the form of individual modules or are integrated.

Problems occur with configurations such as this since the data to be transported is supplied to the central device ZE1. This is true even when, for example, two communications terminals are intended to communicate with one another which are connected to the same peripheral device P1. The wiring complexity involved with such devices increases with the distance between the terminals and the central device ZE1, so that this type of arrangement restricts the area extent of a private branch exchange, or makes the installation considerably more expensive when covering relatively large areas.

One alternative to achieve an area extent with a single device 150 would be to network a number of devices 150, but this would result in the loss of the advantages of a single system. An aggravating factor when networking a number of such devices 150 is the need to provide and to install additional trunk modules with additional connecting cables in each case.

Problems likewise occur with the modular expansion capability of such devices, both in terms of the number of connections and in the amount of data to be transmitted. The switching matrix MTS may exist, by way of example, as an entity. In the worst case, this means that a new switching matrix with, for example, 4096 connections is purchased and installed for one additional connection. In systems such as these, the transmission rate is limited, for example, by the capability to transmit a maximum of 64 kbits, or some other administratively defined or technically restricted amount of data, in each time slot, as is specified by the ISDN Standard. This type of configuration also does not allow each individual communication link to be operated at different data rates.

Figure 2:
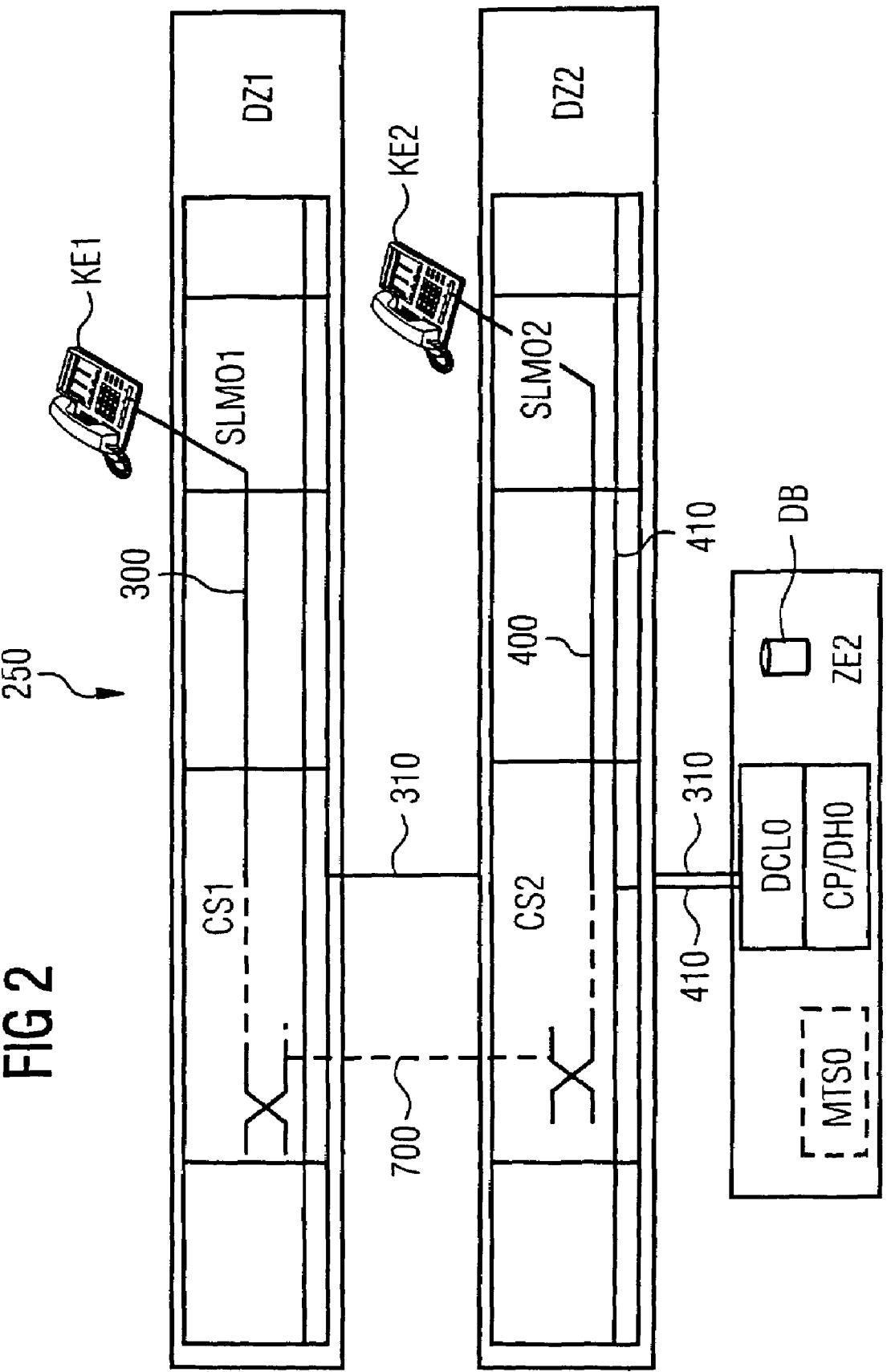
FIG. 2 shows an example of a communications arrangement of a first type.

FIG. 2 shows an example of a high-performance arrangement for setting up communications links. By way of example, this arrangement shows the setting up of a private branch exchange 250 of a first type.

Identical components of the device to those in FIG. 1 are annotated by the same reference symbols in FIG. 2. When looking at FIG. 2, there is a separate transport network 700 and a separate network 310/410. This configuration of a switching system has the advantage that already existing networks, such as private or public networks, can be used for the transport network. The control network just needs to be routed to the central device ZE2 in this case.

In this case, the digital or analog communications terminals KE1 and KE2 are shown as being connected to respective subscriber line modules SLMO1 and SLMO2. However, without any restriction to the invention, it is also feasible for terminals which can be connected directly to the transport network 700, with bypassing, or without any SLMO, to be used and to be integrated in an arrangement 250 such as this. ATM terminals or IP-based (Internet Protocol) terminals can thus also be connected.

As can also be seen, the decentralized devices DZ1 and DZ2 have respective decentralized switching devices CS1 and CS2 which may, for example, be in the form of ATM access devices. The illustration likewise shows that the switching matrix MTS0 is no longer used for connection tasks. Instead of this, the connection tasks are carried out by the transport network.

In this arrangement, at least one control information item, which is derived from time-slot-related control information, is in each case provided for setting up the communications link for this purpose, just for the respective decentralized switching devices CS1 and CS2, via the control lines 410 and 310. Furthermore, this figure shows that PCM data is converted to ATM cell data on a data path 300 or 400.

It is either possible to provide a separate conversion device for this purpose in the data flow of the connections 300, 400, or for this function to be integrated in the decentralized switching device CS1, CS2. If this device is in the form of a programmable computer, the implementation function can be implemented as a program, in order to control the switching devices in this way.

In this case, it should be noted that the use of an ATM network as a transport network serves as an exemplary embodiment in this case. Ethernet networks, other IP connections or even TDM connections may also be used for this purpose. The choice is dependent on the intended application, and covers the entire range of available networks both in the narrowband field and in the broadband field.

Since there are no communications links to the central device ZE2 in FIG. 2, no call charges need be paid with this first type for any connections from DZ1 and DZ2 to the central device ZE2 via public lines, for example tie lines, as is the case when communicating from DZ1 to DZ2 with a remote peripheral device 150 in FIG. 1.

Call processing as a function of the transport network is preferably carried out on the decentralized switching devices CS1 and CS2, but this is essentially restricted to the basic call functionality. Service features are in this case provided by the central controller ZE2. Connections between the various decentralized devices are controlled by the central device ZE2 via signaling. Arrangements such as these have both a narrowband and a broadband capability. The transport network can be set up both on public networks and on private networks, or else on a mixture of both. Remote decentralized devices can be allocated to the central device ZE2 without any physical restriction, so that even very large devices of the first type can be provided by such a private branch exchange, and are once again used for supply communications links to large areas.

The retention of a central device for control purposes makes it possible to continue to use already existing software with minimal changes. If the controller, in the same way as the switching matrix as well, were to be distributed, then new methods would need to be developed for control purposes, and a mechanism would have to be created to ensure consistency between distributed databases. A further advantage of such a device 250 over network systems of the second type is that the distributed system is a single system, for which reason it is likewise possible to provide service features which are implemented throughout the entire system. There is thus no need to convert individual service features in order to provide them with the capability for operation on a network.

FIG. 3 shows a communications arrangement in which two different communications devices of a first and of a second type are integrated in one private branch exchange 500.

A decentralized device DZ10 of the first type is shown with a decentralized switching device CS10 and a communications terminal KE10, which are identical to the types of the two known devices from the description relating to FIG. 2.

Peripheral devices P10 and P20 of the second type are shown, with one peripheral device being equipped with a decentralized switching device CS20, in order to make it possible to set up and maintain a connection to the decentralized device DZ10 of the communications device of the first type. The transport-network-specific call processing is carried out there, and TDM data is converted to other transport-network-specific data types in, for example, a conversion apparatus. The function of the peripheral device P20 is identical to that of a peripheral device which was described in the explanation relating to FIG. 1. In contrast to this, this allows communication between the digital or analog communications terminal K20, which is connected to SLMO20, and the digital or analog communications terminal K10, which is connected to SLMO10, via the peripheral device P10 with a decentralized switching device CS20, and via the transport network 700, as well as the decentralized switching device CS10. The decentralized switching device CS20 is illustrated in an additional peripheral device P10 to make the illustration clearer, although it could likewise be arranged in P20. The control network is not shown either, since it is configured in a manner equivalent to superimposition of the illustrations in FIGS. 1 and 2.

Control signals are produced for switching matrix MTS, in order to set up connections in the area of the communications device of the second type. As a rule, TDM-based private branch exchanges use a TDM switching matrix MTS such as this for physical connection of individual subscribers. In this case, a setting command 1 is produced for this switching matrix, which results in a first explicit time slot being connected from a first explicit PCM data path to a second explicit time slot in a second explicit PCM data path. Two connection sections are thus connected to form a continuous path between KE1 and KE2 via the switching matrix MTS.

In communications devices of the first type, setting commands such as these are used to set up connections via the transport network.

Time-slot-specific and data-path-specific allocations of terminals to decentralized and peripheral devices are carried out in order to set up a connection to a database DB. Setting commands produced for the switching matrix are converted, for their use in a decentralized switching device CS10, CS20, to one or more messages to the decentralized switching devices, and have such allocations added to them. These control commands are referred to as SB2. A conversion apparatus for time-specific format conversion of the data to be transmitted is in this case integrated, for example, in a decentralized switching device CS10, CS20. In this case, this, for example, converts PCM data to ATM data, and vice versa.

In the case of integrated arrangements such as these, it should be noted that a separate time slot is provided at the switching matrix MTS for the communication between a peripheral device P10 or P20 and decentralized devices DZ10.

This is necessary since, in the integrated arrangement 3, subsections are connected to one another in order to produce a connection over the entire path from the communications terminal KE10 to the communications terminal KE20. In detail, these subsections are as follows:

TS1, comprising the connection sections 300 from KE10 to the decentralized switching device CS10 via the transport network 700 to the decentralized switching device CS20 as a subsection in the communication device of the first type; 200A from the decentralized switching device CS20 to the MTS as a subsection in the communications device of the second type, and 200 from the MTS to the communications terminal KE20, likewise as a subsection in the communications device of the second type.

The control of an integrated arrangement also generates setting commands 1 as in systems of the second type, in order to keep the development work resulting from the integration at a low level. An additional software module adapts the setting command 1 in order to produce control commands which are understood by systems of the first and second types. In order to control the setting up of the connection on the subsections, the time-slot-related and data-path-related components of the setting command 1 are used for the subsections 200 and 300, 700. An additional time slot on one data path is used for the subsection 200A, and this is likewise a task of the software module.

A setting command 2, such as one understood by a system of the second type, is used for connecting the subsection 200A and the subsection 200 to the MTS. A path is thus produced from the communications terminal KE20 to the decentralized switching device CS20. Control commands SB2 such as those which a system of the first type understands are used for connecting the switching device CS20 to the communications terminal KE10 on the subsection TS1.

An overall path is thus connected through from KE20 to KE10.

A number of CS20s can preferably be used in peripheral devices in order to increase the transmission capacity. In this case, there may, for example, be a fixed association between one CS20 and one peripheral device, or an association between the destination and a decentralized device or data path, or other association variants; by way of example, CS20s can also be pooled in order to increase the capacity, in which case a free unit is sought, as required, without any restriction in the association. This advantageously allows the existing capacity to be used as well as possible.

What is claimed is:

1. A method for setting up and/or clearing a communications link via communication devices of at least a first and a second type in a system including a control network and a separate data transport network based on the same physical network, the method comprising:

using the control network to signal the first and second types of communication devices to control the setting up and/or clearing of communications links between the first and second types of communication devices, wherein the control signals are communicated via a central device of the control network; and using at least one decentralized switching device of the data transport network to provide data communication paths between the first and second types of communication devices, such that the data communications between the first and second types of communication devices are not routed through the central device of the control network.

2. The method as claimed in claim 1, wherein the connection is set up and/or cleared via a central device for the second type.

3. The method as claimed in claim 1, wherein the connection is set up via a transport network for the first type.

4. The method as claimed in claim 1, in which the central device controls a decentralized switching device.

5. The method as claimed in claim 1, in which communications data for the communications link is converted in the region of a decentralized switching device for communication devices of different types.

6. The method as claimed in claim 1, in which the time slot control information is linked to a transport-network-specific information item and is transmitted to a decentralized device.

7. The method as claimed in claim 1, in which an asynchronous transmission method is used for transmission via the communications link.

8. A system for setting up and/or clearing a communications link via communication devices of at least a first and a second type, comprising:
- a transport network to provide the communications link between a first communication device of a first type and a second communication device of a second type;
- a control network to control the setting up and/or clearing of the communications link between the first and second communication devices;
- a switching matrix to provide the communications link between the first and second communication devices; and
- means for controlling the setting up and/or clearing of connections in the transport network through the control network, the means being operatively connected to the switching matrix, and connection control information for the switching matrix being supplied to them as part of a control information item;
- wherein the switching matrix is decentralized from a central device of the control network in order to provide a backup connection between the first and second communication devices independent of the central device of the control network.

9. The system as claimed in claim 8, in which the transport network has a different topology than the control network.

10. The system as claimed in claim 8, in which the transport network has at least one decentralized device for connection of a communications terminal, and has a switching device in the region of the decentralized device which provides the communications link in the transport network.

11. The system as claimed in claim 8, in which the communications device of the second type has at least one peripheral device with at least one device for connection of a communications terminal, and has a switching device to provide the communications link in the transport network.

12. The system as claimed in claim 8, which has a conversion apparatus for conversion of communication data, which conversion apparatus converts communication data in at least one data flow direction as a function of the type of communication device, with at least data types for a communication device of the first type and for a communication device of the second type.

13. The system as claimed in claim 12, in which the conversion apparatus is configured in the data flow in the immediate vicinity of a decentralized switching device.

14. The system as claimed in claim 8, which has central means for providing at least one connection-related service feature, the means being operatively connected to the central device.

15. The system as claimed in claim 8, which is in the form of a private branch exchange and has at least one decentralized device for connection of communications terminals.

16. The system as claimed in claim 8, which has a control device to provide the communications link in the region of the decentralized device, if a central control device is not available.

* * * * *